United States Patent
Mitchell (10) Patent No.: US 9,151,670 B1
(45) Date of Patent: Oct. 6, 2015

(54) DYNAMIC SYSTEM RESOLUTION

(71) Applicant: Thomas A. Mitchell, Nazareth, PA (US)

(72) Inventor: Thomas A. Mitchell, Nazareth, PA (US)

(73) Assignee: Wavefront Research, Inc., Bethlehem, PA (US)

( * ) Notice: Subject to any disclaimer, the term of this patent is extended or adjusted under 35 U.S.C. 154(b) by 0 days.

(21) Appl. No.: 14/216,248

(22) Filed: Mar. 17, 2014

Related U.S. Application Data (60) Provisional application No. 61/793,844, filed on Mar. 15, 2013.

(51) Int. Cl.
    *G01J 3/28* (2006.01)
    *G01J 3/02* (2006.01)
    *G01J 3/18* (2006.01)

(52) U.S. Cl.
    CPC ............... *G01J 3/02* (2013.01); *G01J 3/2803* (2013.01); *G01J 3/2823* (2013.01); *G01J 3/18* (2013.01)

(58) Field of Classification Search
    CPC ............... G01J 3/02; G01J 3/10; G01J 3/18; G01J 3/28; G01J 3/2803; G01J 3/2823
    USPC ........................................ 356/300–334
    See application file for complete search history.

(56) References Cited

U.S. PATENT DOCUMENTS

| | | | | |
|---|---|---|---|---|
| 7,061,611 | B2 * | 6/2006 | Mitchell | 356/328 |
| 7,382,498 | B1 * | 6/2008 | Cook | 356/328 |
| 8,203,710 | B1 * | 6/2012 | Mitchell | 356/328 |

* cited by examiner

*Primary Examiner* — Abdullahi Nur
(74) *Attorney, Agent, or Firm* — Burns & Levinson LLP; Orlando Lopez (57) ABSTRACT

The present disclosure provides a spectrometer. In one aspect, the spectrometer includes at least one slit element located at an object plane, an optical sub-system having at least one optical element, at least one dispersive element, and at least one detecting element located substantially at an image plane. The optical sub-system is configured to substantially collimate, at said dispersive element, electromagnetic radiation emanating from said at least one slit element, configured to substantially image the substantially collimated electromagnetic radiation from said dispersive element onto the image plane, and configured to have a substantially variable focal length.

17 Claims, 7 Drawing Sheets

DYNAMIC SYSTEM RESOLUTION

CROSS-REFERENCE TO RELATED APPLICATIONS

This application claims priority to U.S. Provision Application No. 61/793,844, filed Mar. 15, 2013, the entire contents of which is incorporated herein by reference and for all purposes.

BACKGROUND

These teachings generally relate to spectrometers.

There is a need for designs that have the capability to adjust the spatial or spectral resolution of a spectrometer.

SUMMARY

Various embodiments of the present disclosure provide a spectrometer with adjustable spatial and/or spectral resolution.

Certain characteristics of the present disclosure provide a spectrometer design that has adjustable spatial resolution.

Further characteristics of the present disclosure provide a spectrometer design that has adjustable spectral resolution.

Further characteristics of the present disclosure provide a spectrometer design that is compact in size.

Still further characteristics of the present disclosure provide a spectrometer design that has a combination of the characteristics described above with superior trade-offs than have been previously attainable.

For a better understanding of the present invention, together with other and further objects thereof, reference is made to the accompanying drawings and detailed description.

DETAILED DESCRIPTION

Relay imagers and spectrometer designs which have adjustable spatial or spectral resolution are disclosed herein below.

Figure 1A:
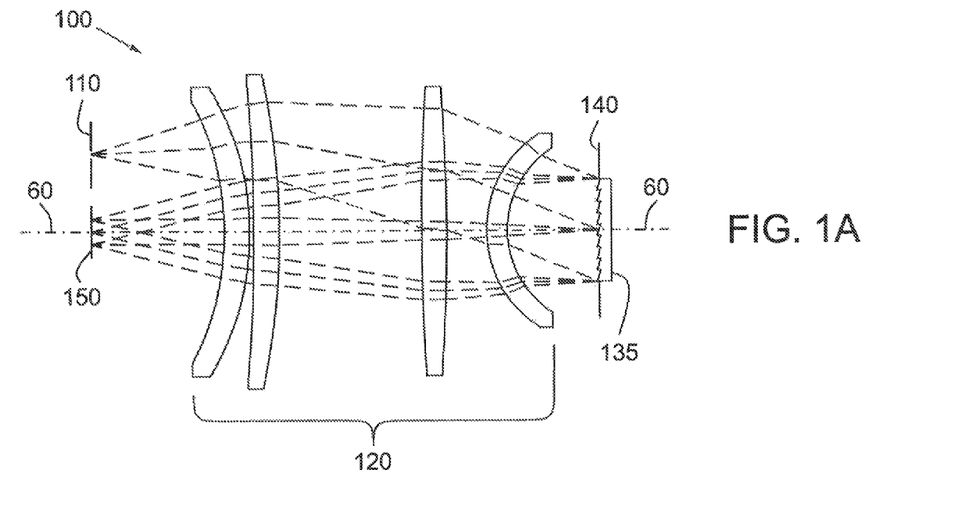
FIGS. 1A-1B are schematic views of a previously presented compact refractive relay spectrometer, taken along its optical axis in the plane parallel to and perpendicular to the direction of dispersion respectively.
Figure 1B:
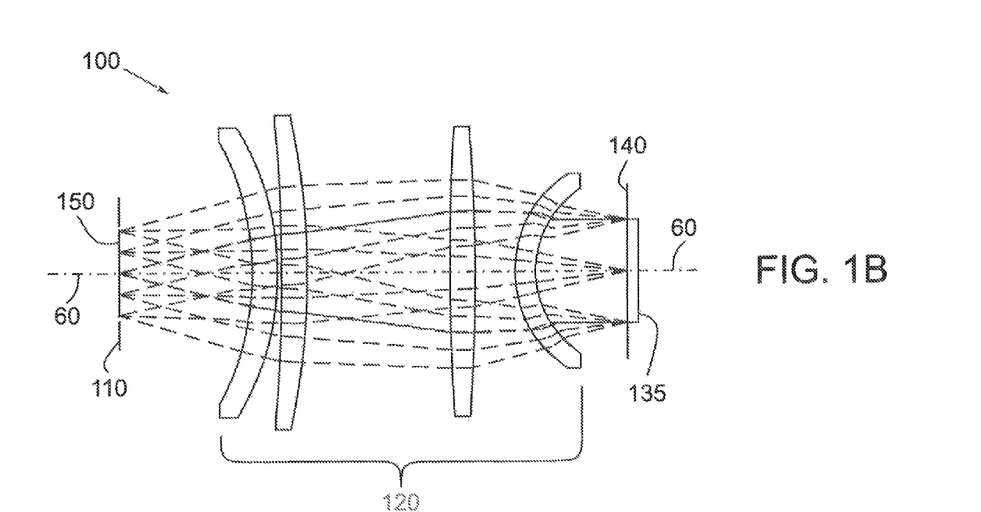

Reference is made to FIG. 1A, which is a schematic view of a conventional refractive relay spectrometer 100, taken along its optical axis 60 in the plane parallel to the direction of dispersion. See, for example, U.S. Pat. No. 7,061,611, which is incorporated here by reference in its entirety for all purposes. Reference is made to FIG. 1B, which is a schematic view of the refractive relay spectrometer 100 illustrated in FIG. 1A, taken along its optical axis 60 in the plane perpendicular to the direction of dispersion.

In operation, electromagnetic radiation (typically in the ultraviolet, visible, and/or infrared bands, hereinafter referred to generally as light) emitted or reflected by a given object (either real or virtual, hereinafter referred to generally as the source) located at the object plane (in this embodiment, but not limited to, a slit or other method of extracting a line image, hereinafter referred to generally as a slit element 110) is incident on an optical system 120, which is capable of substantially receiving a portion of the light emanating from the slit 110 and substantially collimating the light at a plane 140. The light is then incident on a dispersing element 135, which is located substantially at the center plane 140 and capable of substantially receiving the light from the optical system 120 and capable of substantially reflecting the light and dispersing it according to its wavelength. The reflected dispersed light is then incident on the optical system 120, which is capable of substantially receiving the reflected dispersed light from the dispersing element 135 and substantially focusing the light to a detecting element 150.

In certain applications, it is often desirable for reasons such as, but not limited to, illumination conditions, spectral or spatial feature sizes of the desired target, or data collection rates, to have the capability to adjust the spatial or spectral resolution of a spectrometer. Spectrometer designs having the dynamic system resolution of the present teachings can provide this capability.

Figure 2A:
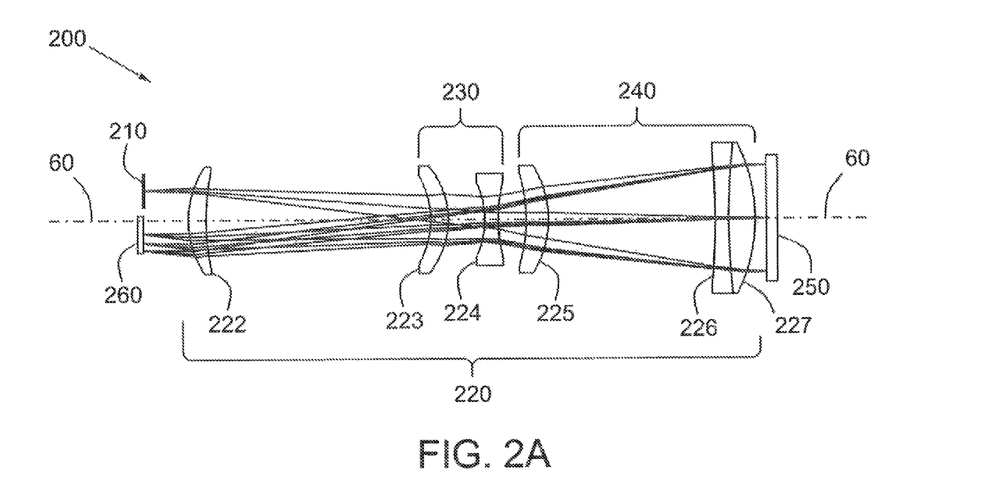
FIGS. 2A-2F are schematic views of an optical imaging system, taken along its optical axis, in accordance with an embodiment of the present disclosure.
Figure 2B:
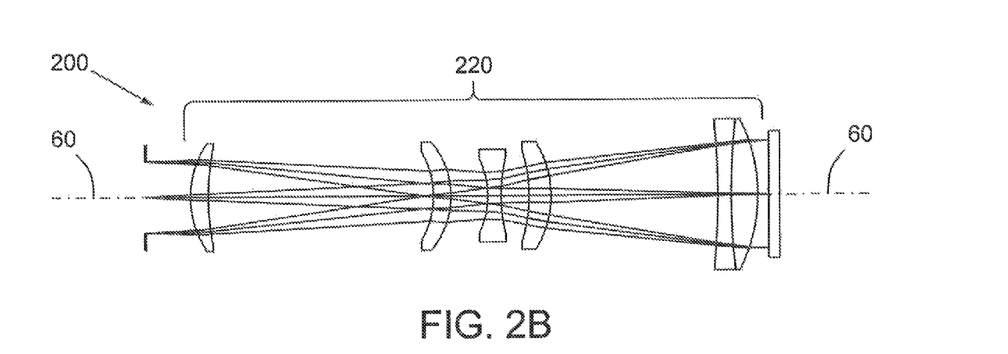
Figure 2C:
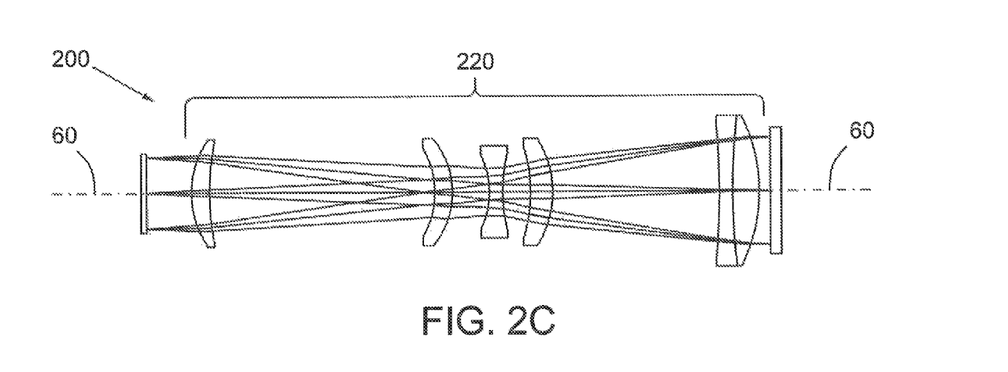
Figure 2D:
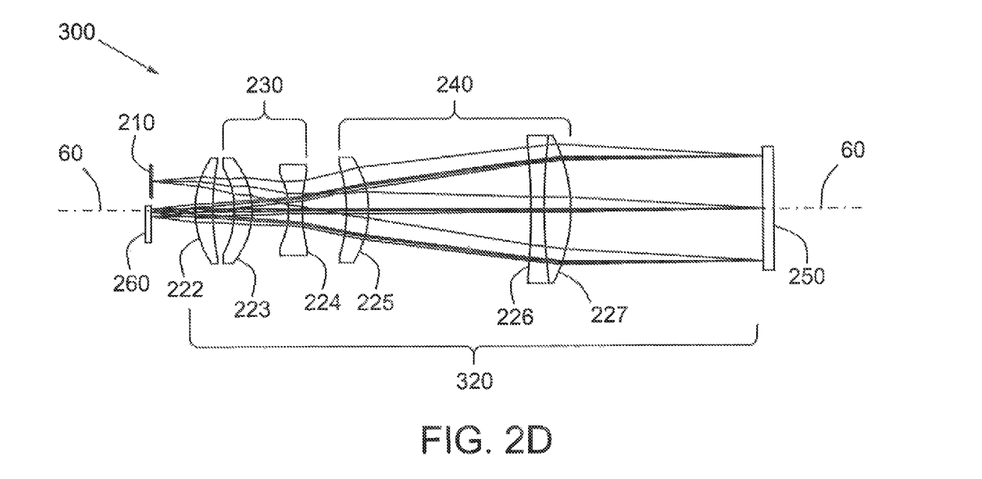

One embodiment of an optical imaging system is illustrated in FIGS. 2A-2F, where the spectral imaging characteristics for two different zoom configurations, a first configuration having a maximum spectral resolution and a second configuration having a minimum spectral resolution, are shown in FIG. 2A and FIG. 2D respectively. In FIG. 2A, the spectrometer is zoomed to its maximum spectral resolution configuration by translating at least one portion of the optical elements of an optical system 220, in this embodiment made up of, but not limited to, the two portions 230 and 240, such that the effective single pass focal length of the optical system 220 is at a maximum value. In this maximum spectral resolution configuration, light that is passed by the slit 210 is first collimated by the optical system 220 onto the dispersing element 250, where it is then reflected and dispersed according to its wavelength, and is finally focused by the optical system 220 in its second pass onto a detecting element 260.

In FIG. 2D, the optical system 220 is zoomed to its minimum spectral resolution configuration by translating at least one portion of the optical elements of the optical system 220, in this embodiment made up of, but not limited to, the two portions 230 and 240, such that the effective single pass focal length of the optical system 220 is at a minimum value. Since the dispersion of the dispersing element 250 is unchanged, the shorter focal length of the optical system 220 results in a smaller spatial extent of the dispersed imagery on the detecting element 260, which for a fixed spatial detector resolution results in a lower spectral resolution.

Reference is made to FIG. 2A, which is a schematic view of an embodiment of an optical imaging system 200, taken along its optical axis 205 in the plane parallel to the direction of dispersion. In operation, light emitted or reflected by the source, located at the slit element 210, is incident on the optical system 220, in this embodiment made up of, but not limited to, refractive elements 222, 223, 224, 225, 226, and 227, which is capable of substantially receiving a portion of the light emanating from the slit 210 and substantially collimating the light substantially at the dispersing element 250, which is capable of substantially receiving the light from the optical system 220 and capable of substantially reflecting the light and dispersing it according to its wavelength. The reflected dispersed light is then incident on the optical system 220, which is capable of substantially receiving the reflected dispersed light from the dispersing element 250 and substantially focusing the light to the detecting element 260.

Reference is now made to FIG. 2D, which is a schematic view of an embodiment of an optical imaging system 300, taken along its optical axis 205 in the plane parallel to the direction of dispersion, where a portion of the optical elements in the optical system 220 of the embodiment of the optical system 200 illustrated in FIG. 2A are translated along the optical axis 205. In operation, light emitted or reflected by the source, located at the slit element 210, is incident on the optical system 320, in this embodiment made up of, but not limited to, refractive elements 222, 223, 224, 225, 226, and 227, which is capable of substantially receiving a portion of the light emanating from the slit 210 and substantially collimating the light substantially at the dispersing element 250, which is capable of substantially receiving the light from the optical system 320 and capable of substantially reflecting the light and dispersing it according to its wavelength. The reflected dispersed light is then incident on the optical system 320, which is capable of substantially receiving the reflected dispersed light from the dispersing element 250 and substantially focusing the light to the detecting element 260.

Figure 2E:
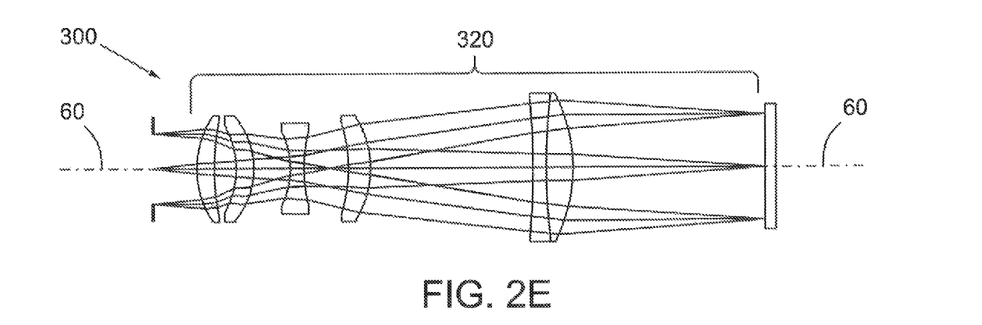
Figure 2F:
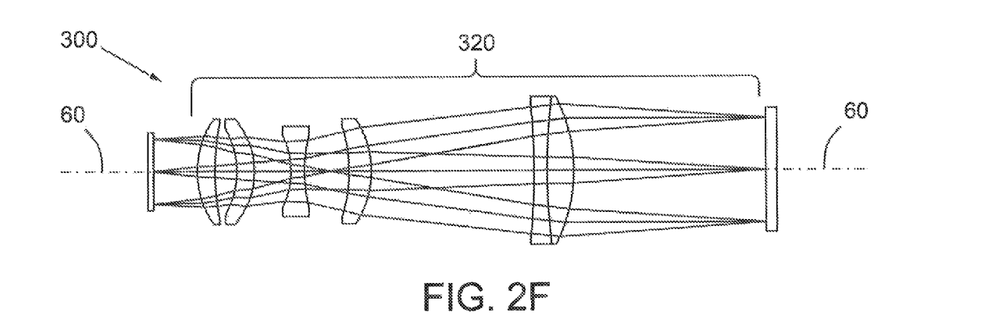

FIG. 2B and FIG. 2C illustrate the spatial imaging characteristics of the embodiment of the optical imaging system 200 illustrated in FIG. 2A in its maximum spectral resolution configuration while FIG. 2E and FIG. 2F illustrate the spatial imaging characteristics of the embodiment of the optical imaging system 300 illustrated in FIG. 2B in its minimum spectral resolution configuration. In both embodiments of the optical system 200 and 300, light emanating from the slit 120 is first collimated by the optical systems 220 and 320 respectively onto the dispersing element 250, as illustrated in FIG. 2B and FIG. 2E for the maximum and minimum spectral resolution configurations of the embodiments of the optical imaging system 200 and 300 respectively. The light is then reflected and dispersed according to its wavelength by the dispersing element 250, and is focused by the same optical system 220 and 320 onto the detecting element 260, as illustrated in FIG. 2C and FIG. 2F respectively, for the maximum and minimum spectral resolution configurations of the embodiments of the optical imaging system 200 and 300 respectively. In both embodiments of the optical system 200 and 300, the spatial magnification of the light emanating from the slit 210 is maintained substantially at unity regardless of the change in spectral resolution due to the symmetry of the double pass design form.

Figure 3A:
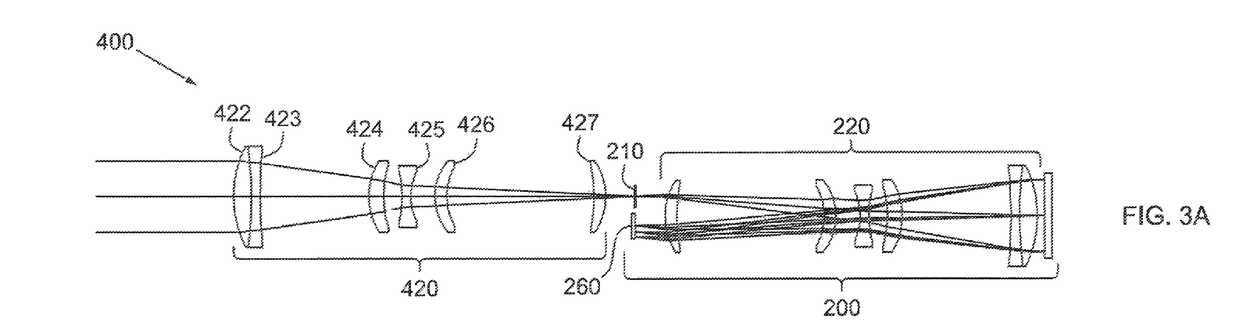
FIGS. 3A-3F are schematic views of an optical imaging system, taken along its optical axis, in accordance with another embodiment of the present disclosure.
Figure 3B:
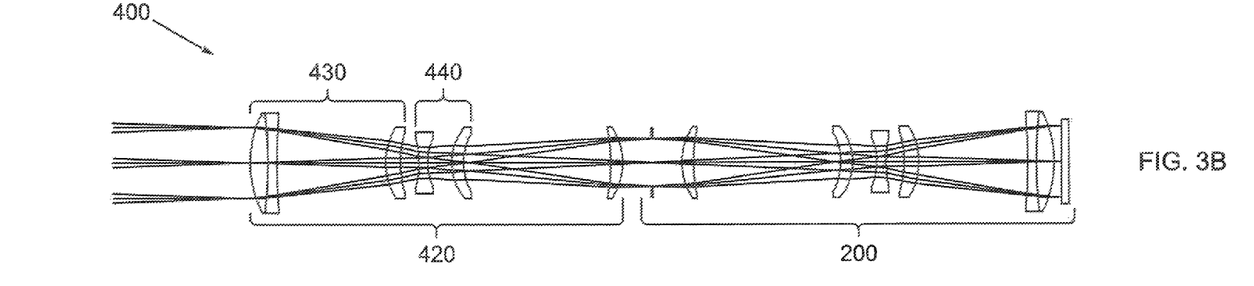

Another embodiment of an optical imaging system 400 is illustrated in FIGS. 3A-3B, where a zoom imager, the working principles of which may be known in the art, is inserted in front of the slit, such that the image plane of the zoom imager is located substantially at the slit element of optical imaging system 200 illustrated in FIG. 2A, in order to provide an image of a the scene with a variable spatial resolution.

In FIG. 3A, the spectral imaging characteristics of the optical imaging system 400 are illustrated where the zoom imager 420 is shown providing imagery to the slit 210 of optical imaging system 200 illustrated in FIG. 2A, and the optical system 220 of optical imaging system 200 illustrated in FIG. 2A is in its maximum spectral dispersion configuration.

Reference is made to FIG. 3B, where the zoom imager 420 is zoomed to its maximum focal length configuration by translating at least one portion of the optical elements of the zoom imager 420 comprising two portions 430 and 440. The spatial imaging characteristics of optical imaging system 400 are illustrated where the zoom imager 430 is shown in its maximum focal length configuration, providing narrow field of view imagery to the slit.

Figure 3C:
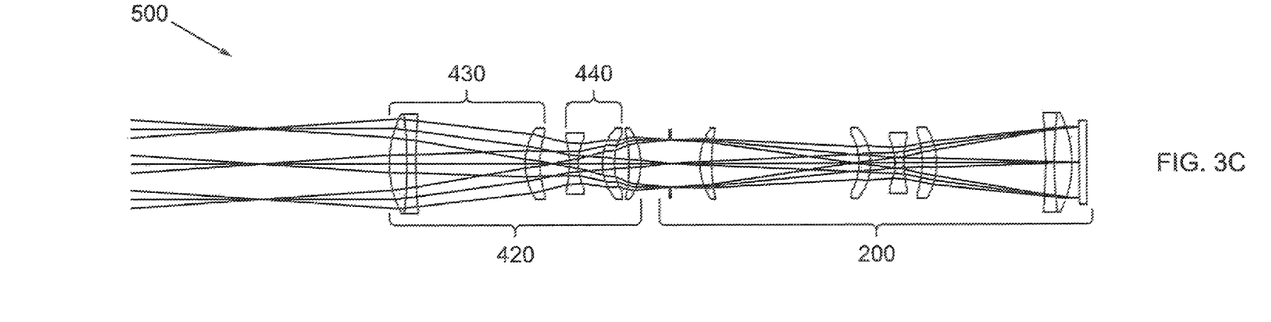

Reference is now made to FIG. 3C, which is another embodiment of an optical imaging system 500, where the zoom imager 420 of optical imaging system 400 illustrated in FIG. 3B is zoomed to its minimum focal length configuration by translating at least one portion of the optical elements in the zoom imager 420 comprising two portions 430 and 440. The spatial imaging characteristics of optical imaging system 500 are illustrated where the zoom imager 430 is shown in its minimum focal length configuration, providing wide field of view imagery to the slit. This variation in field of view of the imager 420 results in a corresponding variation in the spatial resolution of the embodiments of the optical imaging system 400 and 500 at both the slit 210 and detector 260.

Figure 3D:
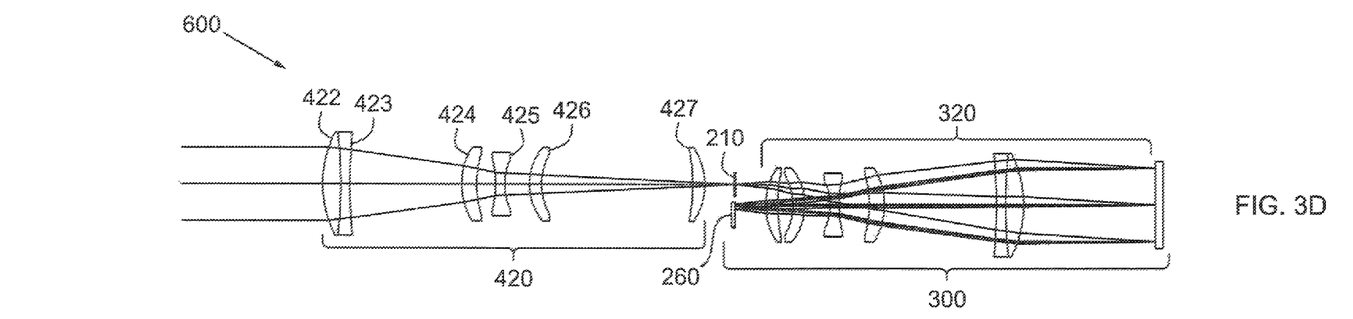
Figure 3E:
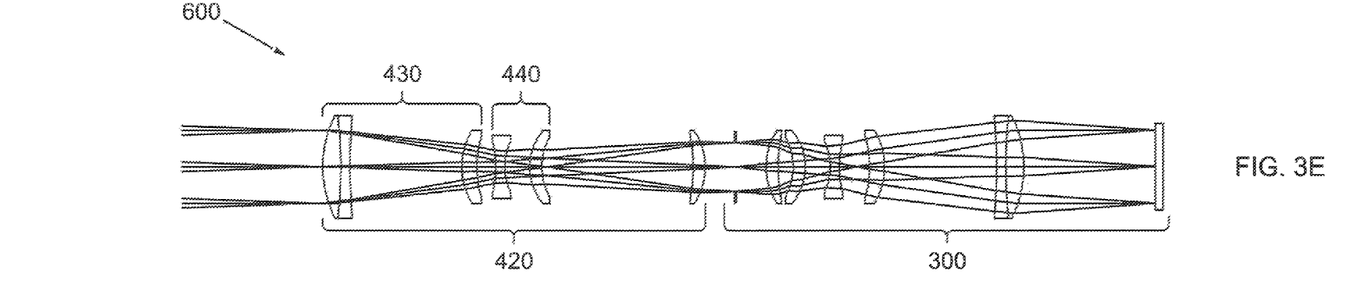
Figure 3F:
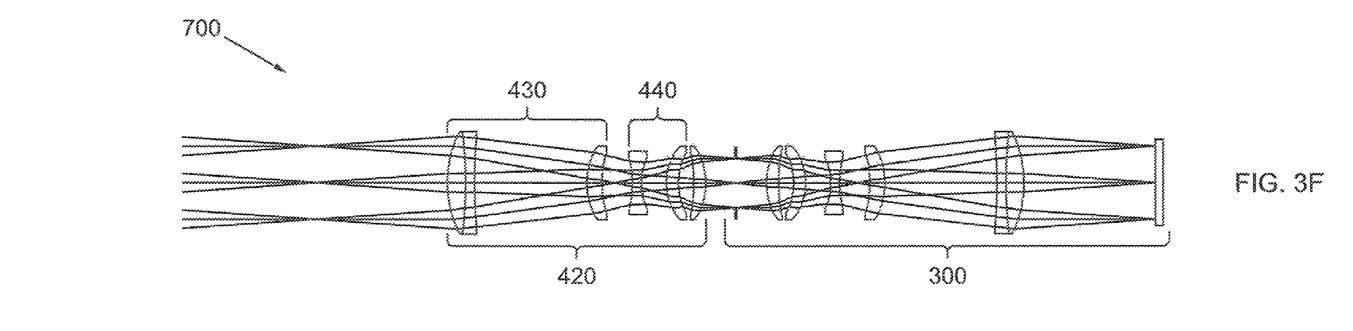

These embodiments of the optical imaging systems 400 and 500 illustrated in FIGS. 3A-3B and FIG. 3C respectively are further illustrated in FIGS. 3D-3F, where the optical imaging system 200 has been adjusted to its minimum spectral resolution configuration, as illustrated in optical imaging system 300 of FIG. 2D.

In FIG. 3D, the spectral imaging characteristics of optical imaging system 600 are illustrated where the zoom imager 420 is shown providing imagery to the slit 210 of optical imaging system 300 illustrated in FIG. 2D, and the optical system 320 of optical imaging system 300 illustrated in FIG. 2D is in its maximum spectral dispersion configuration.

Reference is made to FIG. 3E, where the zoom imager 420 is zoomed to its maximum focal length configuration by translating at least one portion of the optical elements of the zoom imager 420 comprising two portions 430 and 440. The spatial imaging characteristics of optical imaging system 600 are illustrated where the zoom imager 430 is shown in its maximum focal length configuration, providing narrow field of view imagery to the slit.

Reference is now made to FIG. 3F, which is another embodiment of an optical imaging system 700, where the zoom imager 420 of optical imaging system 400 illustrated in FIG. 3B is zoomed to its minimum focal length configuration by translating at least one portion of the optical elements in the zoom imager 420 comprising two portions 430 and 440. The spatial imaging characteristics of optical imaging system 500 are illustrated where the zoom imager 430 is shown in its minimum focal length configuration, providing wide field of view imagery to the slit. This variation in field of view of the zoom imager 420 results in a corresponding variation in the spatial resolution of optical imaging system 600 and 700 at both the slit 210 and detector 260. The combination of the zoom imager 420 with optical imaging system 200 and 300 results in a hyperspectral imaging system that provides the capability to vary the spatial and spectral resolutions independent of one another.

Figure 4A:
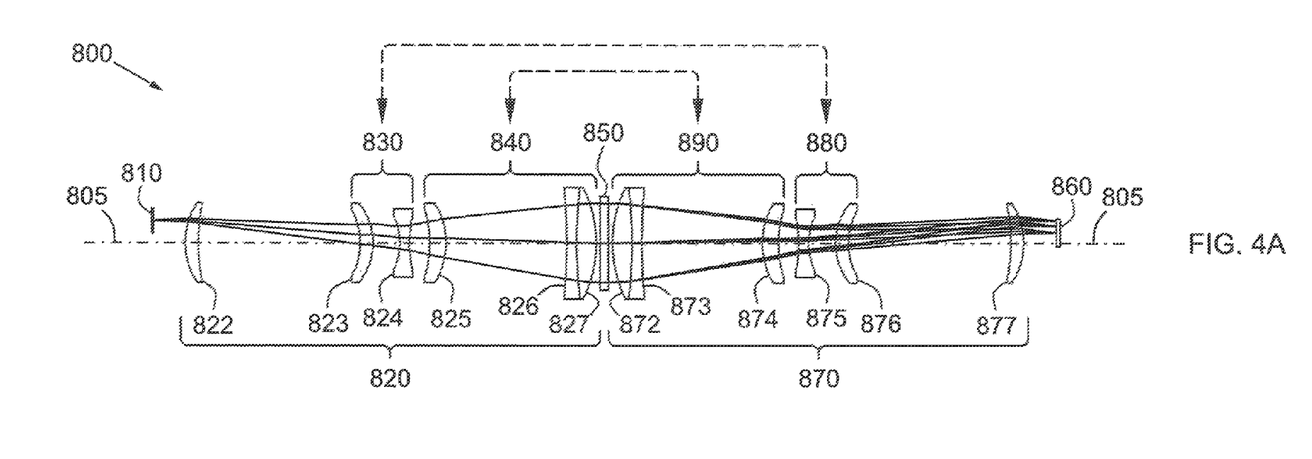
FIGS. 4A-4D are schematic views of an optical imaging system, taken along its optical axis, in accordance with still another embodiment of the present disclosure.
Figure 4B:
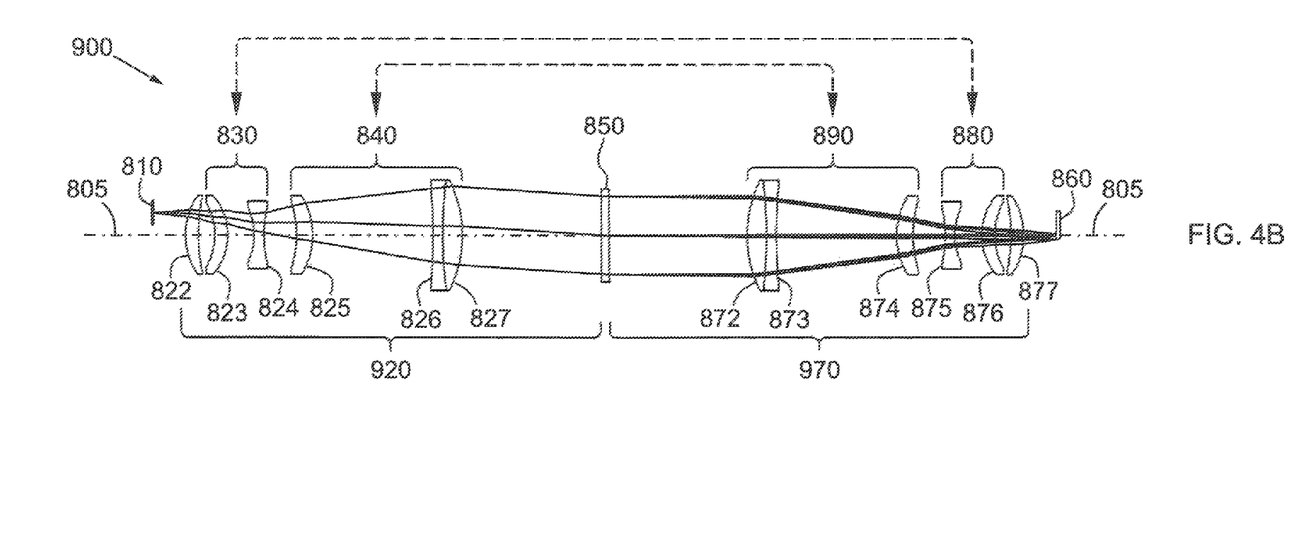

A further embodiment of an optical system is illustrated in FIGS. 4A-4B, where the spectral imaging characteristics for two different zoom configurations, a first configuration having a maximum spectral resolution and a second configuration having a minimum spectral resolution, are shown in FIG. 4A and FIG. 4B respectively.

In FIG. 4A, the spectrometer is zoomed to its maximum spectral resolution configuration by translating at least one portion of the optical elements of a first optical system 820 comprising two portions 830 and 840, and a second optical system 870 comprising two portions 880 and 890, such that effective single pass focal lengths of the first optical system 820 and the second optical system 870 are at a maximum value. In this maximum spectral resolution configuration, light that is passed by the slit 810 is collimated by the first optical system 820 onto the dispersing element 850, where it is then transmitted and dispersed according to its wavelength, and is focused by the second optical system 870 onto the detecting element 860.

In FIG. 4B, the first optical system 820 and the second optical system 870 are zoomed to their minimum spectral resolution configuration by translating at least one portion of the optical elements of the first optical system 820 comprising two portions 830 and 840, and the second optical system 870 comprising two portions 880 and 890, such that the effective single pass focal lengths of the first optical system 820 and the second optical system 870 are at a minimum value. Since the dispersion of the dispersing element 850 is unchanged, the shorter focal length of the second optical system 870 results in a smaller spatial extent of the dispersed imagery on the detecting element 860, which for a fixed spatial detector resolution results in a lower spectral resolution. The first optical system 820 and second optical system 870 are typically substantially symmetric about the dispersing element 850, where the two portions 830 and 840 of the first optical system 820 and the two portions 880 and 890 of the second optical system 870 are symmetrically slaved to one another respectively. This design form is essentially an unfolded version of the zoomed double pass design described previously and illustrated in FIGS. 2A-2F.

Reference is made to FIG. 4A, which is a schematic view of an embodiment of an optical imaging system 800, taken along its optical axis 805 in the plane parallel to the direction of dispersion. In operation, light emitted or reflected by the source, located at the slit element 810, is incident on the first optical system 820 comprising refractive elements 822, 823, 824, 825, 826, and 827, which is capable of substantially receiving a portion of the light emanating from the slit 810 and substantially collimating the light substantially at the dispersing element 850, which is capable of substantially receiving the light from the optical system 820 and capable of substantially transmitting the light and dispersing it according to its wavelength. The transmitted dispersed light is then incident on the second optical system 870 comprising refractive elements 872, 873, 874, 875, 876, and 877, which is capable of substantially receiving the transmitted dispersed light from the dispersing element 850 and substantially focusing the light to the detecting element 860.

Reference is now made to FIG. 4B, which is a schematic view of an embodiment of an optical imaging system 900, taken along its optical axis 805 in the plane parallel to the direction of dispersion, where a portion of the optical elements in the optical system 820 of optical system 800 illustrated in FIG. 4A are translated along the optical axis 805. In operation, light emitted or reflected by the source, located at the slit element 810, is incident on the first optical system 920 comprising refractive elements 822, 823, 824, 825, 826, and 827, which is capable of substantially receiving a portion of the light emanating from the slit 810 and substantially collimating the light substantially at the dispersing element 850, which is capable of substantially receiving the light from the first optical system 920 and capable of substantially transmitting the light and dispersing it according to its wavelength. The transmitted dispersed light is then incident on the second optical system 970 comprising refractive elements 822, 823, 824, 825, 826, and 827, which is capable of substantially receiving the transmitted dispersed light from the dispersing element 850 and substantially focusing the light to the detecting element 860.

Figure 4C:
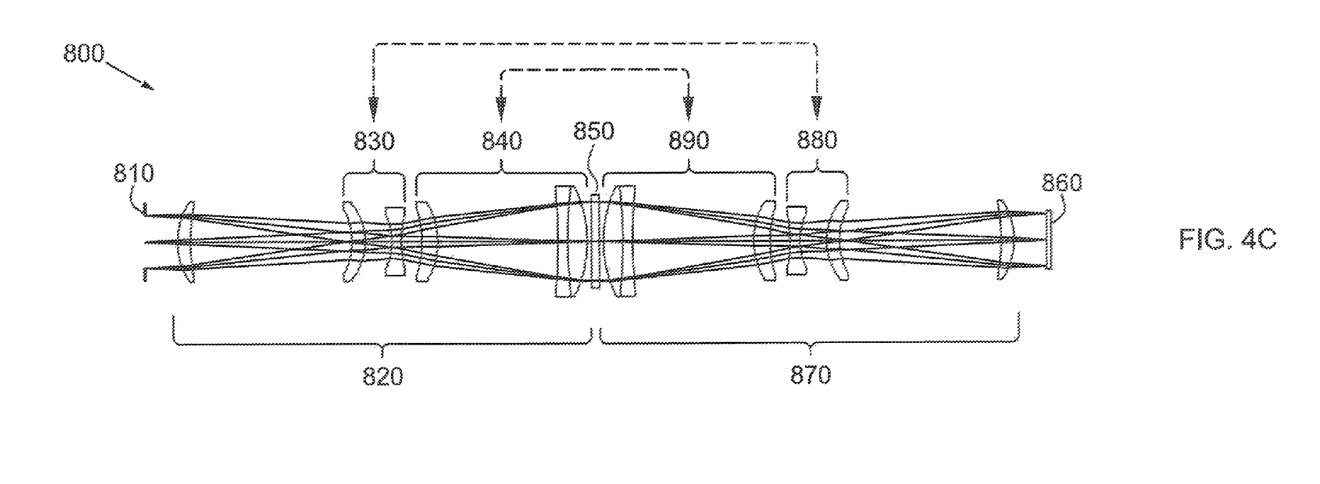
Figure 4D:
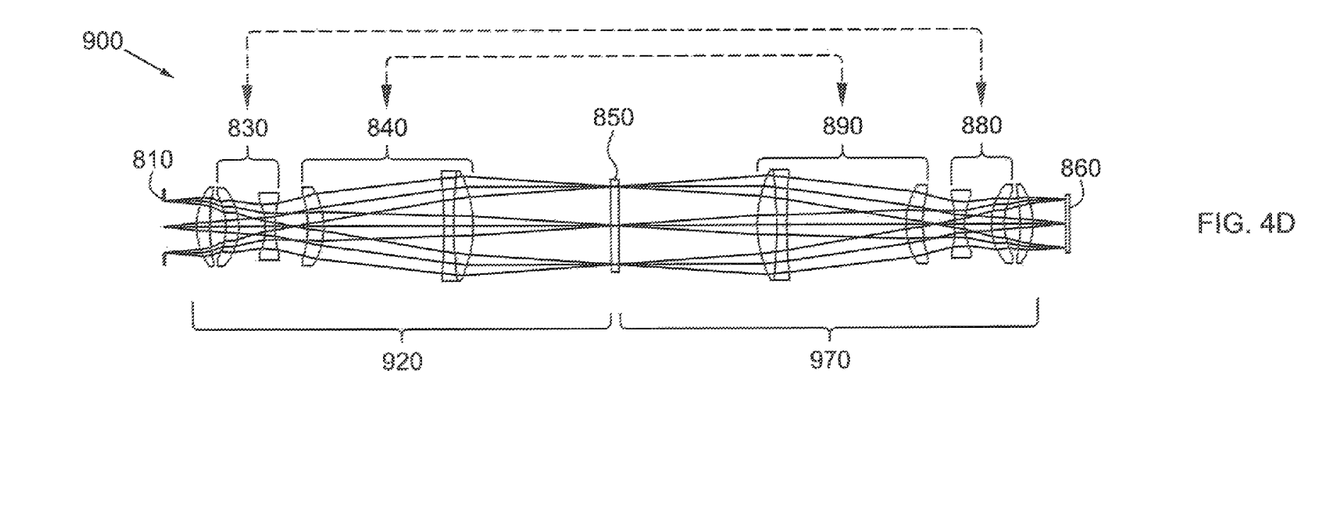

FIG. 4C illustrates the spatial imaging characteristics of the embodiment of the optical imaging system 800 illustrated in FIG. 4A in its maximum spectral resolution configuration while FIG. 4D illustrates the spatial imaging characteristics of optical imaging system 900 illustrated in FIG. 4B in its minimum spectral resolution configuration. In both embodiments of the optical system 800 and 900, light emanating from the slit 220 is first collimated by the first optical systems 820 and 830 respectively onto the dispersing element 850, as illustrated in FIG. 4C and FIG. 40 for the maximum and minimum spectral resolution configurations of the embodiments of the optical imaging system 800 and 900 respectively. The light is then transmitted and dispersed according to its wavelength by the dispersing element 250, and is focused by the second optical systems 870 and 970 respectively onto the detecting element 860. In both embodiments of the optical system 800 and 900, the spatial magnification of the light emanating from the slit 820 is maintained substantially at unity regardless of the change in spectral resolution due to the symmetry of the refractive relay design form.

As used herein, the singular forms "a," "an," and "the" include the plural reference unless the context clearly dictates otherwise. Except where otherwise indicated, all numbers expressing quantities of ingredients, reaction conditions, and so forth used in the specification and claims are to be understood as being modified in all instances by the term "about."

For the purpose of better describing and defining the present disclosure, it is noted that terms of degree (e.g., "substantially," "about," and the like) may be used in the specification and/or in the claims. Such terms of degree are utilized herein to represent the inherent degree of uncertainty that may be attributed to any quantitative comparison, value, measurement, and/or other representation. The terms of degree may also be utilized herein to represent the degree by which a quantitative representation may vary (e.g., ±10%) from a stated reference without resulting in a change in the basic function of the subject matter at issue.

Although embodiments of the present teachings have been described in detail, it is to be understood that such embodiments are described for exemplary and illustrative purposes only. Various changes and/or modifications may be made by those skilled in the relevant art without departing from the spirit and scope of the present disclosure as defined in the appended claims.

What is claimed is:

1. A spectrometer comprising:
   at least one slit element located at an object plane;
   an optical sub-system having at least one optical element;
   at least one dispersive element; and
   at least one detecting element located substantially at an image plane;
   wherein said optical sub-system is configured to substantially collimate, at said at least one dispersive element, electromagnetic radiation emanating from said at least one slit element;
   wherein said optical sub-system is configured to substantially image electromagnetic radiation emanating from said at least one dispersive element onto the image plane;
   wherein said optical sub-system is configured to have a substantially variable focal length,
   said variable focal length configured to produce a substantial change in spectral resolution of the spectrometer without imparting a substantial change in the spatial magnification of the spectrometer.

2. The spectrometer of claim 1, wherein said at least one optical element is a refractive element.

3. The spectrometer of claim 1, wherein said at least one optical element is a reflective element.

4. The spectrometer of claim 1, wherein said optical subsystem comprises at least one optical element capable of substantially translating along an optical axis.

5. A spectrometer comprising:
  at least one slit element located at an object plane;
  a first optical sub-system having at least one optical element, said first optical sub-system being configured to have a substantially variable focal length;
  at least one dispersive element;
  a second optical sub-system having at least one optical element, said second optical sub-system being configured to have a substantially variable focal length, said variable focal length of the first optical sub-system and variable focal length of the second optical sub-system are selected together and configured to produce a substantial change in spectral resolution of the spectrometer without imparting a substantial change in the spatial magnification of the spectrometer; and
  at least one detecting element located substantially at an image plane;
  wherein said first optical sub-system is configured to substantially collimate, at said at least one dispersive element, electromagnetic radiation emanating from said at least one slit element; and
  wherein said second optical sub-system is configured to substantially image electromagnetic radiation emanating from said at least one dispersive element onto the image plane.

6. The spectrometer of claim 5, wherein said at least one optical element is a refractive element.

7. The spectrometer of claim 5, wherein said at least one optical element is a reflective element.

8. The spectrometer of claim 5, wherein at least one of said first and second optical sub-systems comprises at least one optical element configured to substantially translate along an optical axis.

9. An imaging spectrometer comprising:
  at least one slit element;
  a first optical sub-system having at least one optical element, said first optical sub-system being configured to substantially image electromagnetic radiation from an object plane onto said at least one slit element;
  at least one dispersive element;
  a second optical sub-system having at least one optical element, said second optical sub-system being configured to have a substantially variable focal length, and configured to substantially collimate, at said at least one dispersive element, electromagnetic radiation emanating from said at least one slit element;
  a third optical sub-system having at least one optical element, said third optical sub-system being configured to have a substantially variable focal length, and configured to substantially image electromagnetic radiation emanating from said at least one dispersive element onto an image plane, said variable focal length of the second optical sub-system and said variable focal length of the third optical sub-system are selected together and configured such that a substantial change in spectral resolution of the spectrometer is produced without imparting a substantial change in the spatial magnification of the spectrometer; and
  at least one detecting element located substantially at the image plane.

10. The spectrometer of claim 9, wherein said at least one optical element is a refractive element.

11. The spectrometer of claim 9, wherein said at least one optical element is a reflective element.

12. The spectrometer of claim 9, wherein each of said first and second optical sub-systems comprises at least one optical element configured to substantially translate along an optical axis.

13. The spectrometer of claim 9, wherein said first optical sub-system is configured to have a substantially variable focal length, said variable focal length of the first optical sub-system being adapted to produce a substantial change in spatial resolution of the imaging spectrometer without imparting a substantial change in the spectral resolution of the imaging spectrometer; and
  whereby the spatial and spectral resolution of the imaging spectrometer can be varied independently from one another.

14. The spectrometer of claim 13, wherein said first optical sub-system comprises at least one optical element configured to substantially translate along an optical axis.

15. The spectrometer of claim 13, wherein said first optical sub-system and said second optical sub-system are the same optical sub-system in a double-pass configuration.

16. The spectrometer of claim 9, wherein said first optical sub-system and said second optical sub-system are the same optical sub-system in a double-pass configuration.

17. A method for detecting wavelength dependent content of electromagnetic radiation, the method comprising:
  extracting at least one line source of electromagnetic radiation from a source of electromagnetic radiation;
  locating the at least one line source substantially along an optical axis;
  substantially collimating electromagnetic radiation emanating from the at least one line source;
  angularly separating the substantially collimated electromagnetic radiation according to its wavelength;
  imaging the angularly separated electromagnetic radiation onto at least one detecting element;
  substantially varying the spectral dispersion of the angularly separated electromagnetic radiation without substantially varying the spatial magnification; and
  detecting the angularly separated electromagnetic radiation.

* * * * *